United States Patent
Zhao (10) Patent No.: US 12,518,051 B2
(45) Date of Patent: Jan. 6, 2026

(54) PRIVACY-PRESERVING DATA RISK PREVENTION AND CONTROL METHOD, APPARATUS, AND DEVICE

(71) Applicant: Alipay (Hangzhou) Information Technology Co., Ltd., Hangzhou (CN)

(72) Inventor: Hao Zhao, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 164 days.

(21) Appl. No.: 18/283,157

(22) PCT Filed: Mar. 18, 2022

(86) PCT No.: PCT/CN2022/081645
§ 371 (c)(1),
(2) Date: Sep. 20, 2023

(87) PCT Pub. No.: WO2022/199475
PCT Pub. Date: Sep. 29, 2022

(65) Prior Publication Data
US 2024/0169091 A1    May 23, 2024

(30) Foreign Application Priority Data
Mar. 25, 2021 (CN) .......................... 202110322228.2

(51) Int. Cl.
*G06F 21/62* (2013.01)
(52) U.S. Cl.
CPC ................................ *G06F 21/6245* (2013.01)
(58) Field of Classification Search
CPC .................................................. G06F 21/6245
See application file for complete search history.

(56) References Cited

FOREIGN PATENT DOCUMENTS

| CN | 109583228 A | * | 4/2019 | ......... G06F 21/6245 |
|---|---|---|---|---|
| CN | 110348238 A | | 10/2019 | |
| CN | 110955903 A | | 4/2020 | |
| CN | 111539021 A | | 8/2020 | |
| CN | 112926089 A | | 6/2021 | |

OTHER PUBLICATIONS

The International Search Report and Written Opinion of the International Searching Authority for International Application No. PCT/CN2022/081645 mailed on May 25, 2022.

* cited by examiner

*Primary Examiner* — Frantz B Jean
(74) *Attorney, Agent, or Firm* — Womble Bond Dickinson (US) LLP (57) ABSTRACT

Some embodiments of this specification disclose a privacy-preserving data risk prevention and control method, apparatus, and device. The method includes: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

16 Claims, 4 Drawing Sheets

PRIVACY-PRESERVING DATA RISK PREVENTION AND CONTROL METHOD, APPARATUS, AND DEVICE

CROSS-REFERENCE TO RELATED APPLICATIONS

This application is a national stage entry of International Application No. PCT/CN2022/01645 filed on Mar. 18, 2022, which claims priority to Chinese Application No. 202110322228.2 filed on Mar. 25, 2021, the contents of which are incorporated herein by reference in their entirety.

TECHNICAL FIELD

This specification relates to the field of computer technologies, and in particular, to a privacy-preserving data risk prevention and control method, apparatus, and device.

BACKGROUND

With rapid development of the Internet and deepening penetration of the Internet into user life, privacy protection attracts increasing attention. In a scenario of protecting user sensitive information (such as privacy data), there exists a core problem, that is, the privacy data of the user differs from the currency, because the currency can be consumed, and can also be traced, whereas the privacy data of the user can be copied and transferred infinitely. Therefore, user privacy protection is more difficult than currency protection. In view of the above-mentioned problem, it is necessary to provide a technical solution that can control processing procedures such as production, transfer, copy, and destruction of the privacy data of the user, so as to implement user privacy protection.

SUMMARY

Some embodiments of this specification aims to provide a technical solution that can control processing procedures such as production, transfer, copy, and destruction of privacy data of a user, so as to implement user privacy protection.

To implement the above-mentioned technical solution, some embodiments of this specification are described as follows:

Some embodiments of this specification provide a privacy-preserving data risk prevention and control method, where the method includes: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

Some embodiments of this specification provide a privacy-preserving data risk prevention and control apparatus, where the apparatus includes: a request obtaining module, configured to obtain a processing request for target privacy data; an attribute obtaining module, configured to determine privacy data attribute information corresponding to the target privacy data, where the privacy data attribute information includes information of one or more dimensions needed for controlling use of the target privacy data; a control rule determining module, configured to determine a control rule corresponding to the target privacy data based on the privacy data attribute information corresponding to the target privacy data, where the control rule corresponding to the target privacy data is constructed based on an expert knowledge base; and a control module, configured to control compliance of the use of the target privacy data based on the determined control rule corresponding to the target privacy data in a process of responding to the processing request.

Some embodiments of this specification provide a privacy-preserving data risk prevention and control device, including a processor and a memory configured to store a computer-executable instruction, where when being executed, the executable instruction enables the processor to perform the following operations: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

Some embodiments of this specification further provide a storage medium, where the storage medium is configured to store a computer-executable instruction, and the executable instruction is executed to implement the following procedure: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

BRIEF DESCRIPTION OF DRAWINGS

To describe the technical solutions in some embodiments of this specification or in a conventional technology more clearly, the following briefly describes the accompanying drawings needed for describing some embodiments or the conventional technology. Clearly, the accompanying drawings in the following descriptions merely show some embodiments of this specification, and a person of ordinary skill in the art can still derive other drawings from these accompanying drawings without creative efforts.

DESCRIPTION OF EMBODIMENTS

Some embodiments of this specification provide a privacy-preserving data risk prevention and control method, apparatus, and device.

To make a person skilled in the art better understand the technical solutions in this specification, the following clearly and comprehensively describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on some embodiments of this specification without creative efforts shall fall within the protection scope of this specification.

Embodiment 1

Figure 1:
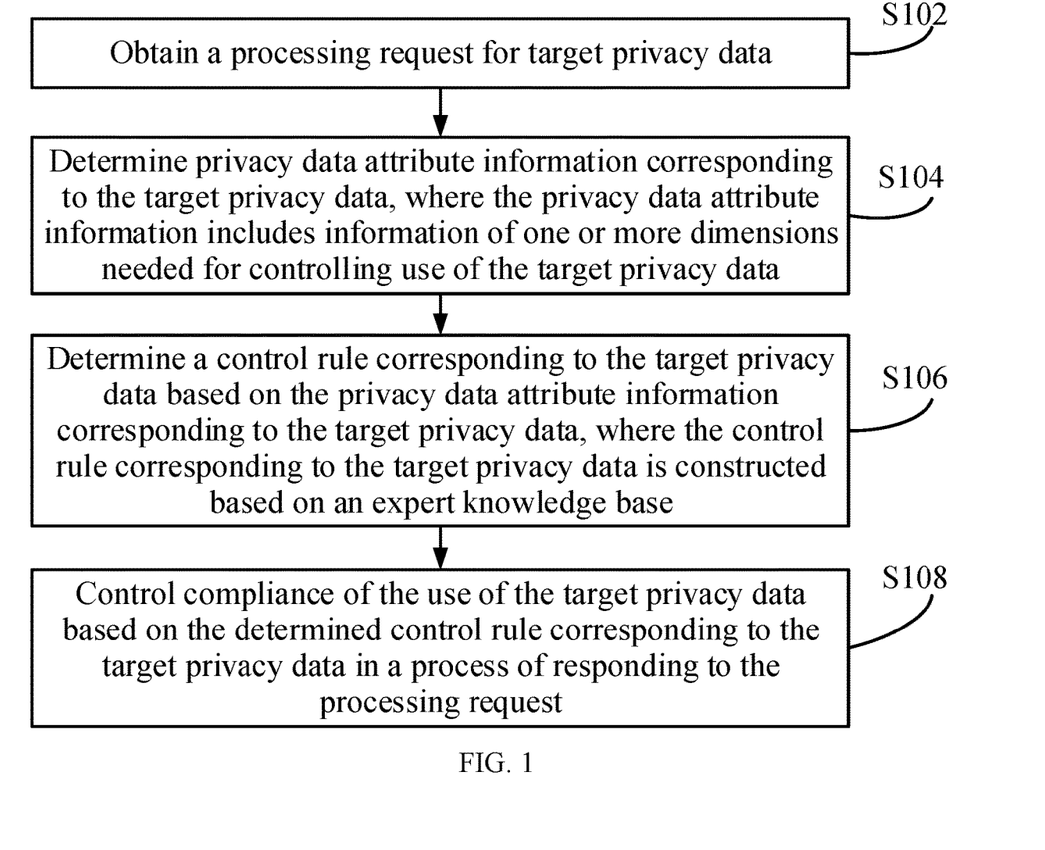
FIG. 1 shows some embodiments of a privacy-preserving data risk prevention and control method according to this specification.

As shown in FIG. 1, some embodiments of this specification provide a privacy-preserving data risk prevention and control method. The method can be performed by a server or a terminal device. The terminal device may be a computer device such as a laptop or a desktop computer, or may be a mobile terminal device such as a mobile phone or a tablet computer. The server may be a server that needs to perform risk prevention and control or control on a service (such as a transaction service or a financial service) or on a use process of privacy data. For example, the server may be a server for a payment service, or may be a server related to a service such as a financial or instant messaging service. In some embodiments, an example in which the execution entity is a terminal device is used for description. For a case in which the execution entity is a server, references can be made to the following related content, and details are not described herein again. The method may specifically include the following steps: Step S102: Obtain a processing request for target privacy data.

The target privacy data may be any privacy data, and the privacy data may be private data that a user does not want to be obtained by another person without authorization. For example, the target privacy data may be specifically data of a face image of the user, fingerprint data of the user, or identity information of the user, and can be specifically set according to an actual situation, which is not limited in some embodiments of this specification. The processing request may include a plurality of types, such as a processing request for copying the target privacy data, a processing request for outputting the target privacy data, a processing request for generating the target privacy data, and a processing request for deregistering or destroying the target privacy data. The processing request can be specifically set according to an actual situation, which is not limited in some embodiments of this specification.

During implementation, with rapid development of the Internet and deepening penetration of the Internet into user life, privacy protection attracts increasing attention. In a scenario of protecting user sensitive information (such as privacy data), there exists a core problem, that is, the privacy data of the user differs from the currency, because the currency can be consumed, and can also be traced, whereas the privacy data of the user can be copied and transferred infinitely. Therefore, user privacy protection is more difficult than currency protection. In view of the above-mentioned problem, it is necessary to provide a technical solution that can control processing procedures such as production, transfer, copy, and destruction of the privacy data of the user, so as to implement user privacy protection. Based on the foregoing description, some embodiments of this specification provide an implementable technical solution, which may specifically include the following content: To improve security of the terminal device and each service processing, an identity authentication mechanism of the user is usually added to the terminal device. In practice, the identity authentication mechanism may include a plurality of types, such as an identity authentication mechanism based on fingerprint recognition, an identity authentication mechanism based on face recognition, an identity authentication mechanism based on iris recognition, and an identity authentication mechanism based on palmprint recognition. However, all identity authentication mechanisms include privacy data of the user (that is, fingerprint data of the user, face data of the user, iris data of the user, or palmprint data of the user).

An application program can be installed in the terminal device. By using the application program, the user can perform various service processing. During the service processing, to protect security of service processing of the user, identity authentication usually needs to be performed on the user. An identity authentication process includes privacy data of the user, and the privacy data of the user can be copied and transferred infinitely. Therefore, how to control processing procedures such as production, transfer, copy, and destruction of the privacy data of the user becomes an important issue that needs to be addressed. In practice, various interfaces configured to process the privacy data of the user can be reconstructed (or HOOK processing is performed on various interfaces used to process the privacy data of the user) such that a risk prevention and control mechanism for the privacy data can be set on the above-mentioned interfaces. As such, a use process of the privacy data of the user is controlled by detecting whether the above-mentioned interfaces are called. Specifically, when the terminal device runs the above-mentioned application program, the terminal device can run the risk prevention and control mechanism for the privacy data. When the application program or the terminal device needs to call specific privacy data (that is, the target privacy data) of the user during running to perform specific processing, a processing request for the target privacy data can be sent to an interface that is configured to perform the processing in the terminal device. In such case, the terminal device can detect that the above-mentioned interface is called, and can intercept the processing request for the target privacy data, thereby obtaining the processing request for the target privacy data.

It should be noted that the above-mentioned application program may be an applet mounted in a host program, or the application program may be the above-mentioned host program. The host program may be an APP installed in a mobile terminal device or a PC, an application program on the Internet of Things (IoT), etc. The application program can be specifically set according to an actual situation, which is not limited in some embodiments of this specification.

Step S104: Determine privacy data attribute information corresponding to the target privacy data, where the privacy data attribute information includes information of one or more dimensions needed for controlling use of the target privacy data.

The privacy data attribute information may include attribute information inherent to the target privacy data, for example, a data type (such as a fingerprint data type, a face data type, or a location information type) to which the target privacy data belongs, creator information of the target privacy data, a creation time of the target privacy data, and a historical access record. The privacy data attribute information can be specifically set according to an actual situation, which is not limited in some embodiments of this specification.

During implementation, after the processing request for the target privacy data is obtained by using the above-mentioned method, information about the target privacy data can be obtained. For example, an identifier of the target privacy data can be obtained, and the privacy data attribute information, for example, the data type to which the target privacy data belongs and owner information of the target privacy data, needed for controlling the use of the target privacy data can be determined based on the identifier of the target privacy data. Details can be specifically set according to an actual situation, which is not limited in some embodiments of this specification.

Step S106: Determine a control rule corresponding to the target privacy data based on the privacy data attribute information corresponding to the target privacy data, where the control rule corresponding to the target privacy data is constructed based on an expert knowledge base.

The control rule may include a plurality of types. Different control rules can be set for different privacy data. The control rule may include rules corresponding to a plurality of dimensions, such as a rule corresponding to a lifecycle dimension of the privacy data, a rule corresponding to a transfer behavior dimension of the privacy data, and a rule corresponding to a permission dimension of the privacy data. The control rule can be specifically set according to an actual situation, which is not limited in some embodiments of this specification. The expert knowledge base may be a knowledge database obtained based on experience for processing the privacy data in practice, or may be a knowledge base formed by a related parameter that is randomly generated for the privacy data. The expert knowledge base can be specifically set according to an actual situation, which is not limited in some embodiments of this specification.

During implementation, to facilitate control of different privacy data, different control rules can be set for different privacy data. For example, for privacy data of a biological recognition type, a corresponding control rule may be that the privacy data is only allowed to be used within a specified validity period, and a copy operation is not allowed to be performed on the privacy data. Specifically, for example, the privacy data of the biological recognition type is only allowed to be used within five minutes after timing is started for requesting the privacy data, and a copy operation is not allowed to be performed on the privacy data. Alternatively, for privacy data belonging to an applet that is mounted in the host program, a corresponding control rule may be that only the applet is allowed to use the privacy data, and another applet or the host program is not allowed to use the privacy data, and the privacy data is not allowed to be transferred to another applet or the host program. Details can be set according to an actual situation.

In addition, to simply and quickly determine a control rule applicable to specific privacy data, a mapping relationship between the privacy data attribute information and the control rule corresponding to the privacy data can be established according to an actual situation, which may be shown in Table 1.

TABLE 1

| Privacy data attribute information | Control rule |
| --- | --- |
| Face recognition type | Data of such type is valid within three minutes, and a face recognition image is not allowed to be copied or transferred. |
| Data type corresponding to service information filled in by the user in the application program | Data of such type is not allowed to be accessed by another application program, and is not allowed to be transferred to another application program. |
| Data type corresponding to a location of the user obtained by the application program | Data of such type is not allowed to be accessed by another application program, and is not allowed to be transferred to another application program. |

After the privacy data attribute information corresponding to the target privacy data is determined by using the above-mentioned method, a control rule corresponding to the target privacy data can be obtained from the mapping relationship between the privacy data attribute information and the control rule shown in Table 1 based on the privacy data attribute information corresponding to the target privacy data. Specifically, for example, the target privacy data is privacy data of the face recognition type, and the corresponding control rule that can be obtained from Table 1 is as follows: Data of such type is valid within three minutes, and a face recognition image is not allowed to be copied or transferred. To be specific, the user needs to complete face recognition within three minutes. In addition, during the face recognition, an application program or a terminal device is not allowed to copy the face recognition image, or the face recognition image is not allowed to be transferred to another application program or the terminal device.

The above-mentioned processing in step S106 is merely an optional processing method. In practice, the above-mentioned processing in step S106 may be diverse, and can be specifically set according to an actual situation, which is not limited in some embodiments of this specification.

Step S108: Control compliance of the use of the target privacy data based on the determined control rule corresponding to the target privacy data in a process of responding to the processing request.

During implementation, based on the above-mentioned example of step S106, if the target privacy data is privacy data of the face recognition type (that is, the above-mentioned processing request may be a face recognition request, a payment request, or the like), and the corresponding control rule is that data of such type is valid within three minutes, and a face recognition image is not allowed to be copied or transferred, in the process of responding to the above-mentioned processing request (for example, in the face recognition process), it may be determined whether the user completes face recognition within three minutes. If the user does not complete face recognition within three minutes, the above-mentioned processing request is rejected or it is determined that processing corresponding to the above-mentioned processing request fails, and so on. If the user completes face recognition within three minutes, it is further determined whether the face recognition image is copied, and whether the face recognition image is transferred, and so on in the above-mentioned process. If the above-mentioned processing procedure complies with the control rule, the response to the above-mentioned processing request can be completed. Otherwise, it may be determined that the response to the above-mentioned processing request fails.

According to the privacy-preserving data risk prevention and control method provided in some embodiments of this specification, a processing request for target privacy data is intercepted, and privacy data attribute information corresponding to the target privacy data is determined, where the privacy data attribute information includes information of one or more dimensions needed for controlling use of the target privacy data; then, a control rule corresponding to the target privacy data is determined based on the privacy data attribute information corresponding to the target privacy data, where the control rule corresponding to the target privacy data is constructed based on an expert knowledge base; and then, compliance of the use of the target privacy data is controlled based on the determined control rule corresponding to the target privacy data in a process of responding to the processing request. As such, the use process of the target privacy data is controlled based on the control rule corresponding to the target privacy data, and processing procedures such as production, transfer, copy, and destruction of the privacy data of the user can be further controlled, so as to protect the privacy data of the user.

Embodiment 2

Figure 2:
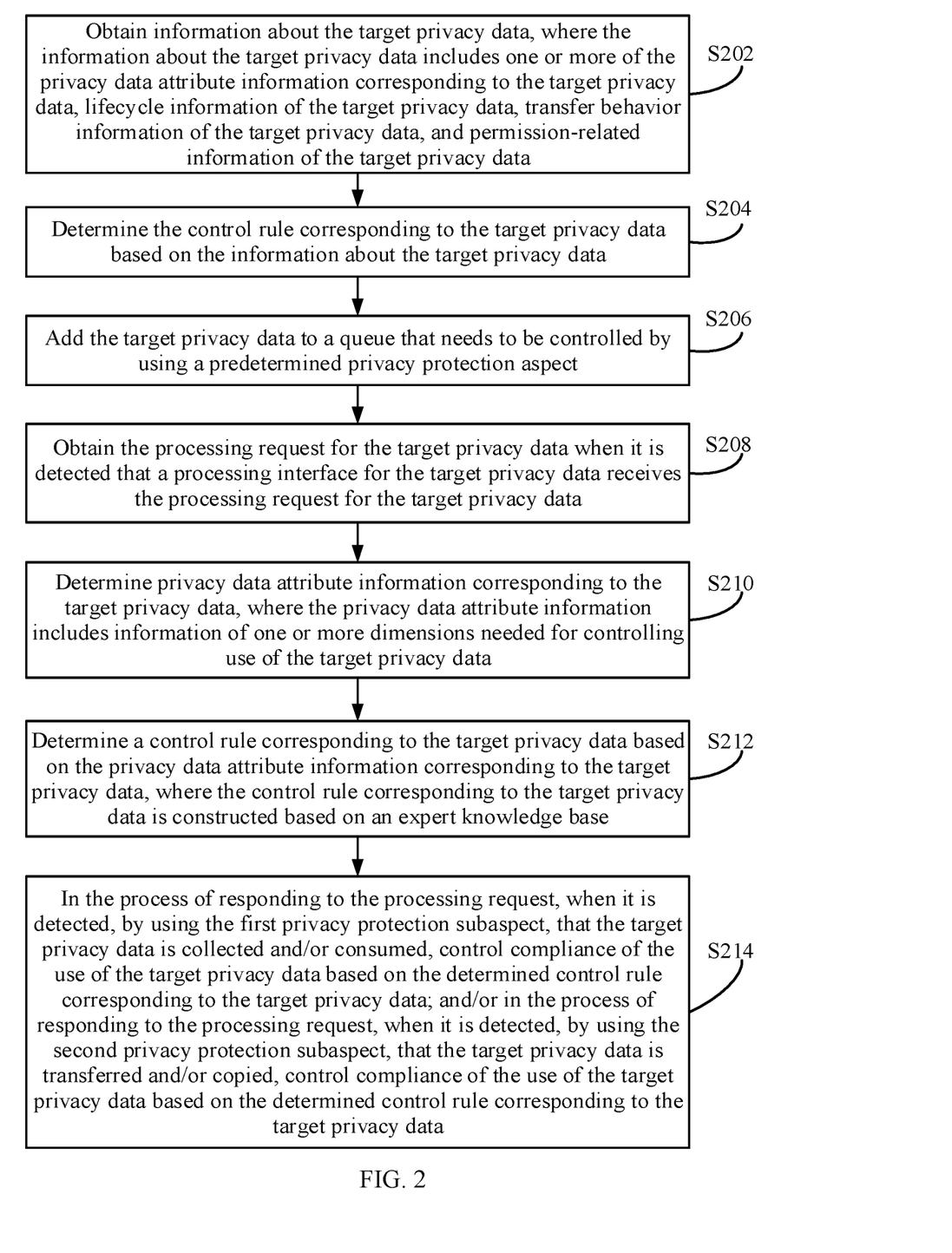
FIG. 2 shows some other embodiments of a privacy-preserving data risk prevention and control method according to this specification.

As shown in FIG. 2, some embodiments of this specification provide a privacy-preserving data risk prevention and control method. The method can be performed by a server or a terminal device. The terminal device may be a computer device such as a laptop or a desktop computer, or may be a mobile terminal device such as a mobile phone or a tablet computer. The server may be a server that needs to perform risk prevention and control or control on a service (such as a transaction service or a financial service) or on a use process of privacy data. For example, the server may be a server for a payment service, or may be a server related to a service such as a financial or instant messaging service. In some embodiments, an example in which the execution entity is a terminal device is used for description. For a case in which the execution entity is a server, references can be made to the following related content, and details are not described herein again. The method may specifically include the following steps: Step S202: Obtain information about the target privacy data, where the information about the target privacy data includes one or more of the privacy data attribute information corresponding to the target privacy data, lifecycle information of the target privacy data, transfer behavior information of the target privacy data, and permission-related information of the target privacy data.

During implementation, to formulate logic for refined control of privacy data, one or more different dimensions can be set according to an actual situation, such as a privacy data type dimension, a privacy data belongingness dimension, a privacy data lifecycle dimension, a privacy data transfer behavior dimension, and a privacy data permission dimension. The privacy data type dimension may include a location type, an environment type (which may include an environment inside the terminal device, an environment outside the terminal device, and the like), a biological recognition type (which may include a fingerprint recognition type, a face recognition type, and the like), and the like. The privacy data lifecycle dimension may include valid duration, transfer times, copy times, and the like of the privacy data. The privacy data transfer behavior dimension may include a transfer purpose, a transfer method, a transfer direction, and the like. The privacy data permission dimension may include a code role that can access the privacy data, a code role that can copy the privacy data, a code role that can forward the privacy data, a code role that can transfer the privacy data, and the like. The privacy data belongingness dimension may include belonging to a user, belonging to a terminal device, belonging to a current application program (which may be an applet mounted in a host program or the host program), and the like.

Step S204: Determine the control rule corresponding to the target privacy data based on the information about the target privacy data.

During implementation, a corresponding control rule is formulated for the refined information of the privacy data. For example, a control rule corresponding to the biological recognition information belonging to the user may be specifically as follows: The biological recognition information is allowed to exist for only five minutes, and is not allowed to be copied. For another example, a control rule corresponding to privacy data belonging to a specific applet may be specifically as follows: The privacy data is not allowed to be accessed by another applet, and is not allowed to be transferred to another applet, and so on. Details can be set according to an actual situation, which is not limited in some embodiments of this specification.

Step S206: Add the target privacy data to a queue that needs to be controlled by using a predetermined privacy protection aspect.

The privacy protection aspect may be an aspect for privacy protection or aspect-oriented programming (AOP). The privacy protection aspect is a programming paradigm that dynamically adds a function to a program without modifying source code through pre-compilation, dynamic runtime proxy, or injection. The AOP pursues decoupling between a caller and a callee, and provides cross-module function aggregation. The AOP is suitable for implementing a system function that includes a cross-cut. It is usually difficult to implement the system function through procedure programming or object-oriented programming. A corresponding aspect defense system can be constructed based on the privacy protection aspect. The aspect defense system may be a security defense system. A core of the aspect defense system is a security integration architecture, which can analyze and control code. A core idea of the aspect defense system is to set up a set of security layers that are interleaved with services and parallel to each other such that security can be integrated into service logic to implement fine observation and defense while ensuring decoupling between a service and security. As such, the service and the security are independent of each other. The aspect defense system can be embedded into a framework of an entire application program (for example, an APP) through a security aspect defense layer, and a rule engine and an upgrade capability that run independently are maintained. Key security-related interfaces included in the APP can be protected by using the aspect. In addition, when the privacy protection aspect or the aspect defense system determines whether a specific call is reasonable, link information of the call is traced and viewed, and a risk for calling the link is viewed perspectively, so as to make accurate and comprehensive judgment.

During implementation, the use process of the target privacy data can be controlled by using the privacy protection aspect. Therefore, the target privacy data can be added to a queue that needs to be controlled by using a predetermined privacy protection aspect.

Figure 3:
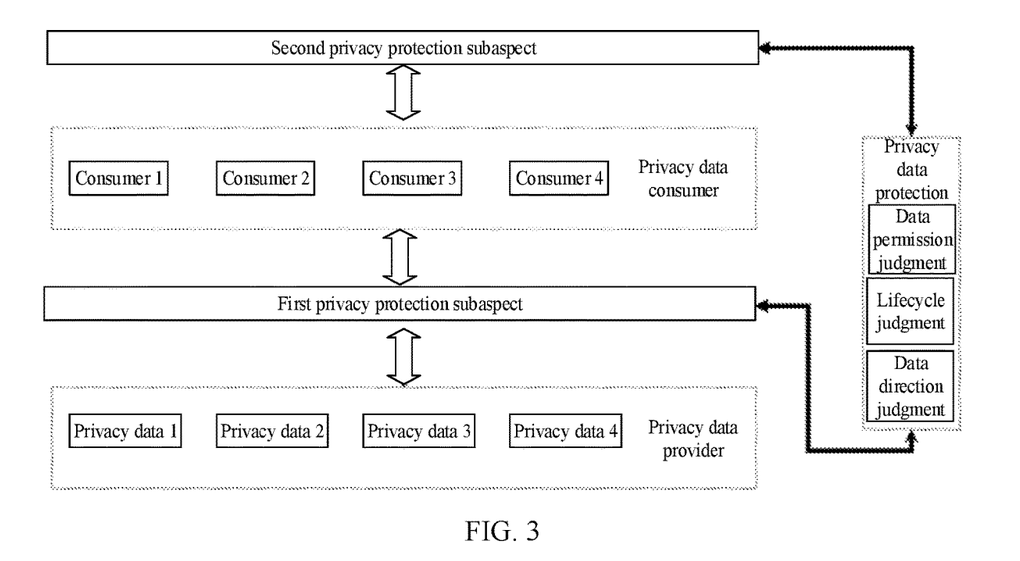
FIG. 3 is a schematic diagram of a privacy protection process and a privacy protection aspect according to this specification.

In practice, as shown in FIG. 3, the privacy protection aspect may include a first privacy protection subaspect and a second privacy protection subaspect, the first privacy protection subaspect may be configured to control processing of the target privacy data in a current terminal device, and the second privacy protection subaspect may be configured to control processing of outputting the target privacy data from the current terminal device. Based on the above-mentioned division of labor for the privacy protection aspect, the processing in step S206 may include: adding, based on the processing request for the target privacy data, the target privacy data to a queue that needs to be controlled by using the first privacy protection subaspect and/or the second privacy protection subaspect.

During implementation, a plurality of different processing demands or processing requests can be preset for any privacy data, and for each processing demand or processing request, the privacy data is separately set to a corresponding control queue. Specifically, as shown in FIG. 3, the processing request for the target privacy data can be analyzed to determine whether the processing request needs to output the target privacy data to the outside of the terminal device. If processing corresponding to the processing request does not need to output the target privacy data to the outside of the terminal device, the target privacy data is added to a queue that needs to be controlled by using the first privacy protection subaspect. If processing corresponding to the processing request needs to output the target privacy data to the outside of the terminal device, the target privacy data is added to a queue that needs to be controlled by using the second privacy protection subaspect.

Step S208: Obtain the processing request for the target privacy data when it is detected that a processing interface for the target privacy data receives the processing request for the target privacy data.

The processing request includes one or more of a transfer request for the target privacy data, a copy request for the target privacy data, a collection request for the target privacy data, a destruction request for the target privacy data, and a consumption request for the target privacy data.

During implementation, when the terminal device runs the above-mentioned application program, the terminal device can run the above-mentioned privacy protection aspect or the aspect defense system. When the application program or the terminal device needs to perform specific processing on the target privacy data during running, a processing request for the target privacy data can be sent to an interface that is configured to process the target privacy data in the terminal device. In such case, the terminal device can detect that the interface is called, and can intercept the processing request for the target privacy data. In such case, to ensure security of the target privacy data, a preset mechanism for obtaining the processing request for the target privacy data can be run to obtain the processing request for the target privacy data.

Step S210: Determine privacy data attribute information corresponding to the target privacy data, where the privacy data attribute information includes information of one or more dimensions needed for controlling use of the target privacy data.

The privacy data attribute information may include a data type and/or owner information of the target privacy data, and the data type may include a location type, an environment type, and a biological recognition type.

During implementation, to formulate logic for refined control of privacy data, one or more different dimensions can be set according to an actual situation, such as a privacy data type dimension, a privacy data belongingness dimension, a privacy data lifecycle dimension, a privacy data transfer behavior dimension, and a privacy data permission dimension. In practice, information of one or more dimensions can be selected from the above-mentioned plurality of different dimensions as the privacy data attribute information corresponding to the target privacy data according to an actual situation, for example, information of a privacy data type and/or privacy data belongingness dimension can be selected as the privacy data attribute information corresponding to the target privacy data.

Step S212: Determine a control rule corresponding to the target privacy data based on the privacy data attribute information corresponding to the target privacy data, where the control rule corresponding to the target privacy data is constructed based on an expert knowledge base.

As shown in FIG. 3, the control rule corresponding to the target privacy data includes one or more of a lifecycle control subrule, a transfer behavior control subrule, and a permission control subrule of the target privacy data. The lifecycle control subrule is constructed by using information of one or more dimensions of valid duration, transfer times, and copy times of the target privacy data. The transfer behavior control subrule is constructed by using information of one or more dimensions of a transfer purpose, a transfer method, and a transfer direction of the target privacy data.

Step S214: In the process of responding to the processing request, when it is detected, by using the first privacy protection subaspect, that the target privacy data is collected and/or consumed, control compliance of the use of the target privacy data based on the determined control rule corresponding to the target privacy data; and/or in the process of responding to the processing request, when it is detected, by using the second privacy protection subaspect, that the target privacy data is transferred and/or copied, control compliance of the use of the target privacy data based on the determined control rule corresponding to the target privacy data.

For specific processing of step S214, references can be made to FIG. 3. To be specific, when it is detected, by using the first privacy protection subaspect, that the target privacy data is consumed, compliance of the use of the target privacy data is controlled based on the determined control rule corresponding to the target privacy data; in the above-mentioned process of responding to the processing request, when it is detected, by using the second privacy protection subaspect, that the target privacy data is transferred, compliance of the use of the target privacy data is controlled based on the determined control rule corresponding to the target privacy data.

According to the privacy-preserving data risk prevention and control method provided in some embodiments of this specification, a processing request for target privacy data is intercepted, and privacy data attribute information corresponding to the target privacy data is determined, where the privacy data attribute information includes information of one or more dimensions needed for controlling use of the target privacy data; then, a control rule corresponding to the target privacy data is determined based on the privacy data attribute information corresponding to the target privacy data, where the control rule corresponding to the target privacy data is constructed based on an expert knowledge base; and then, compliance of the use of the target privacy data is controlled based on the determined control rule corresponding to the target privacy data in a process of responding to the processing request. As such, the use process of the target privacy data is controlled based on the control rule corresponding to the target privacy data, and processing procedures such as production, transfer, copy, and destruction of the privacy data of the user can be further controlled, so as to protect the privacy data of the user.

Embodiment 3

Figure 4:
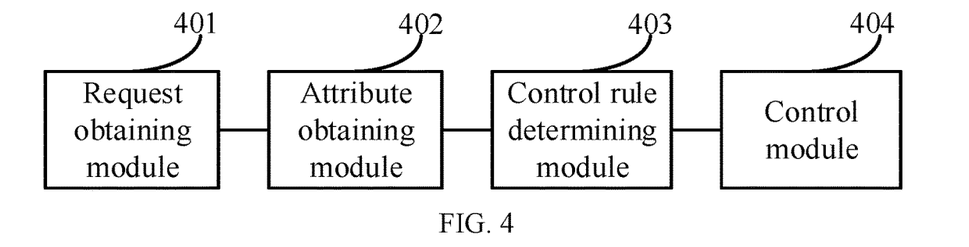
FIG. 4 shows some embodiments of a privacy-preserving data risk prevention and control apparatus according to this specification.

The privacy-preserving data risk prevention and control method provided in some embodiments of this specification has been described above. Based on the same idea, some embodiments of this specification further provide a privacy-preserving data risk prevention and control apparatus, as shown in FIG. 4.

The privacy-preserving data risk prevention and control apparatus includes a request obtaining module 401, an attribute obtaining module 402, a control rule determining module 403, and a control module 404. The request obtaining module 401 is configured to obtain a processing request for target privacy data. The attribute obtaining module 402 is configured to determine privacy data attribute information corresponding to the target privacy data, where the privacy data attribute information includes information of one or more dimensions needed for controlling use of the target privacy data. The control rule determining module 403 is configured to determine a control rule corresponding to the target privacy data based on the privacy data attribute information corresponding to the target privacy data, where the control rule corresponding to the target privacy data is constructed based on an expert knowledge base. The control module 404 is configured to control compliance of the use of the target privacy data based on the determined control rule corresponding to the target privacy data in a process of responding to the processing request.

In some embodiments of this specification, the apparatus further includes a queue setting module, configured to add the target privacy data to a queue that needs to be controlled by using a predetermined privacy protection aspect. The request obtaining module 401 is configured to obtain the processing request for the target privacy data when it is detected that a processing interface for the target privacy data receives the processing request for the target privacy data.

In some embodiments of this specification, the privacy protection aspect includes a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device. The queue setting module is configured to add, based on the processing request for the target privacy data, the target privacy data to a queue that needs to be controlled by using the first privacy protection subaspect and/or the second privacy protection subaspect. The control module 404 is configured to: in the process of responding to the processing request, when it is detected, by using the first privacy protection subaspect, that the target privacy data is collected and/or consumed, control compliance of the use of the target privacy data based on the determined control rule corresponding to the target privacy data; and/or in the process of responding to the processing request, when it is detected, by using the second privacy protection subaspect, that the target privacy data is transferred and/or copied, control compliance of the use of the target privacy data based on the determined control rule corresponding to the target privacy data.

In some embodiments of this specification, the processing request includes one or more of a transfer request for the target privacy data, a copy request for the target privacy data, a collection request for the target privacy data, a destruction request for the target privacy data, and a consumption request for the target privacy data.

In some embodiments of this specification, the privacy data attribute information includes a data type and/or owner information of the target privacy data, and the data type includes a location type, an environment type, and a biological recognition type.

In some embodiments of this specification, the control rule corresponding to the target privacy data includes one or more of a lifecycle control subrule, a transfer behavior control subrule, and a permission control subrule of the target privacy data.

In some embodiments of this specification, the lifecycle control subrule is constructed by using information of one or more dimensions of valid duration, transfer times, and copy times of the target privacy data.

In some embodiments of this specification, the transfer behavior control subrule is constructed by using information of one or more dimensions of a transfer purpose, a transfer method, and a transfer direction of the target privacy data.

In some embodiments of this specification, the apparatus further includes: an information obtaining module, configured to obtain information about the target privacy data, where the information about the target privacy data includes one or more of the privacy data attribute information corresponding to the target privacy data, lifecycle information of the target privacy data, transfer behavior information of the target privacy data, and permission-related information of the target privacy data; and a control rule determining module, configured to determine a control rule corresponding to the target privacy data based on the information about the target privacy data.

According to the privacy-preserving data risk prevention and control apparatus provided in some embodiments of this specification, a processing request for target privacy data is intercepted, and privacy data attribute information corresponding to the target privacy data is determined, where the privacy data attribute information includes information of one or more dimensions needed for controlling use of the target privacy data; then, a control rule corresponding to the target privacy data is determined based on the privacy data attribute information corresponding to the target privacy data, where the control rule corresponding to the target privacy data is constructed based on an expert knowledge base; and then, compliance of the use of the target privacy data is controlled based on the determined control rule corresponding to the target privacy data in a process of responding to the processing request. As such, the use process of the target privacy data is controlled based on the control rule corresponding to the target privacy data, and processing procedures such as production, transfer, copy, and destruction of the privacy data of the user can be further controlled, so as to protect the privacy data of the user.

Embodiment 4

Figure 5:
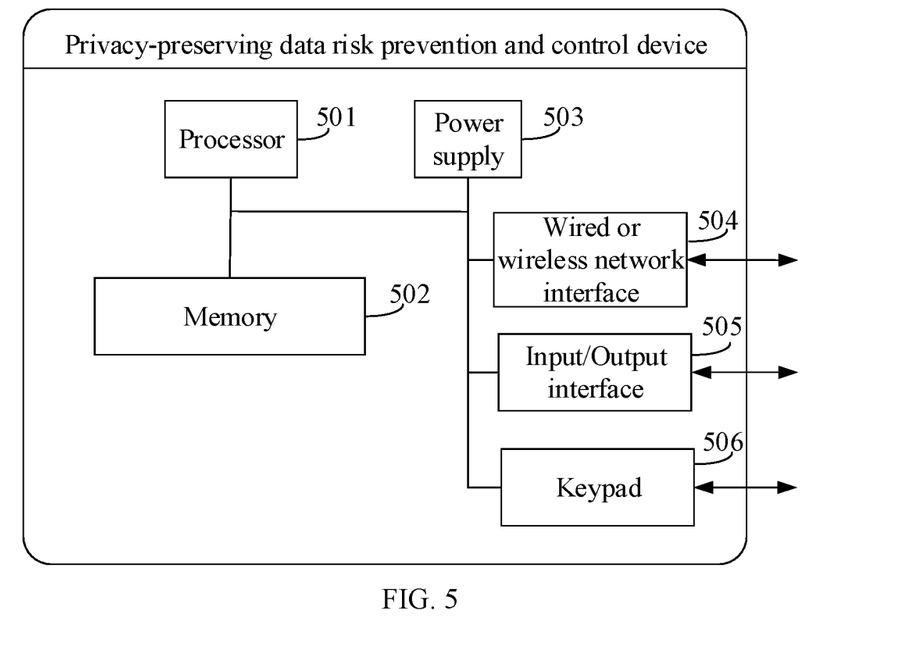
FIG. 5 shows some embodiments of a privacy-preserving data risk prevention and control device according to this specification.

The privacy-preserving data risk prevention and control apparatus provided in some embodiments of this specification has been described above. Based on the same idea, some embodiments of this specification further provide a privacy-preserving data risk prevention and control device, as shown in FIG. 5.

The privacy-preserving data risk prevention and control device may be a terminal device, a server, or the like provided in some embodiments described above.

The privacy-preserving data risk prevention and control device may differ greatly because of a difference in configuration or performance, and may include one or more processors 501 and one or more memories 502. The memory 502 can store one or more application programs or data. The memory 502 may be a temporary storage or a persistent storage. The application program stored in the memory 502 may include one or more modules (not shown in the figure), and each module may include a series of computer-executable instructions in the privacy-preserving data risk prevention and control device. Still further, the processor 501 may be configured to communicate with the memory 502 to execute a series of computer-executable instructions in the memory 502 on the privacy-preserving data risk prevention and control device. The privacy-preserving data risk prevention and control device may further include one or more power supplies 503, one or more wired or wireless network interfaces 504, one or more input/output interfaces 505, one or more keypads 506, etc.

Specifically, in some embodiments, the privacy-preserving data risk prevention and control device includes a memory and one or more programs. The one or more programs are stored in the memory, and the one or more programs may include one or more modules, and each module may include a series of computer-executable instructions in the privacy-preserving data risk prevention and control device. One or more processors are configured to execute the computer-executable instructions included in the one or more programs to perform the following operations: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

In some embodiments of this specification, the above-mentioned operations further include adding the target privacy data to a queue that needs to be controlled by using a predetermined privacy protection aspect. The obtaining a processing request for target privacy data includes obtaining the processing request for the target privacy data when it is detected that a processing interface for the target privacy data receives the processing request for the target privacy data.

In some embodiments of this specification, the privacy protection aspect includes a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device. The adding the target privacy data to a queue that needs to be controlled by using a predetermined privacy protection aspect includes: adding, based on the processing request for the target privacy data, the target privacy data to a queue that needs to be controlled by using the first privacy protection subaspect and/or the second privacy protection subaspect. The controlling compliance of the use of the target privacy data based on the determined control rule corresponding to the target privacy data in a process of responding to the processing request includes: in the process of responding to the processing request, when it is detected, by using the first privacy protection subaspect, that the target privacy data is collected and/or consumed, controlling compliance of the use of the target privacy data based on the determined control rule corresponding to the target privacy data; and/or in the process of responding to the processing request, when it is detected, by using the second privacy protection subaspect, that the target privacy data is transferred and/or copied, controlling compliance of the use of the target privacy data based on the determined control rule corresponding to the target privacy data.

In some embodiments of this specification, the processing request includes one or more of a transfer request for the target privacy data, a copy request for the target privacy data, a collection request for the target privacy data, a destruction request for the target privacy data, and a consumption request for the target privacy data.

In some embodiments of this specification, the privacy data attribute information includes a data type and/or owner information of the target privacy data, and the data type includes a location type, an environment type, and a biological recognition type.

In some embodiments of this specification, the control rule corresponding to the target privacy data includes one or more of a lifecycle control subrule, a transfer behavior control subrule, and a permission control subrule of the target privacy data.

In some embodiments of this specification, the lifecycle control subrule is constructed by using information of one or more dimensions of valid duration, transfer times, and copy times of the target privacy data.

In some embodiments of this specification, the transfer behavior control subrule is constructed by using information of one or more dimensions of a transfer purpose, a transfer method, and a transfer direction of the target privacy data.

In some embodiments of this specification, the above-mentioned operations further include: obtaining information about the target privacy data, where the information about the target privacy data includes one or more of the privacy data attribute information corresponding to the target privacy data, lifecycle information of the target privacy data, transfer behavior information of the target privacy data, and permission-related information of the target privacy data; and determining a control rule corresponding to the target privacy data based on the information about the target privacy data.

According to the privacy-preserving data risk prevention and control device provided in some embodiments of this specification, a processing request for target privacy data is intercepted, and privacy data attribute information corresponding to the target privacy data is determined, where the privacy data attribute information includes information of one or more dimensions needed for controlling use of the target privacy data; then, a control rule corresponding to the target privacy data is determined based on the privacy data attribute information corresponding to the target privacy data, where the control rule corresponding to the target privacy data is constructed based on an expert knowledge base; and then, compliance of the use of the target privacy data is controlled based on the determined control rule corresponding to the target privacy data in a process of responding to the processing request. As such, the use process of the target privacy data is controlled based on the control rule corresponding to the target privacy data, and processing procedures such as production, transfer, copy, and destruction of the privacy data of the user can be further controlled, so as to protect the privacy data of the user.

Embodiment 5

Further, based on the above-mentioned methods shown in FIG. 1 to FIG. 3, one or more embodiments of this specification further provide a storage medium, configured to store computer-executable instruction information. In some specific embodiments, the storage medium may be a USB flash drive, an optical disc, a hard disk, etc., and the computer-executable instruction information stored in the storage medium can be executed by the processor to implement the following procedure: obtaining a processing request for target privacy data; determining privacy data attribute information corresponding to the target privacy data, where the privacy data attribute information includes information of one or more dimensions needed for controlling use of the target privacy data; determining a control rule corresponding to the target privacy data based on the privacy data attribute information corresponding to the target privacy data, where the control rule corresponding to the target privacy data is constructed based on an expert knowledge base; and controlling compliance of the use of the target privacy data based on the determined control rule corresponding to the target privacy data in a process of responding to the processing request.

In some embodiments of this specification, the above-mentioned procedure further includes adding the target privacy data to a queue that needs to be controlled by using a predetermined privacy protection aspect. The obtaining a processing request for target privacy data includes obtaining the processing request for the target privacy data when it is detected that a processing interface for the target privacy data receives the processing request for the target privacy data.

In some embodiments of this specification, the privacy protection aspect includes a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device. The adding the target privacy data to a queue that needs to be controlled by using a predetermined privacy protection aspect includes: adding, based on the processing request for the target privacy data, the target privacy data to a queue that needs to be controlled by using the first privacy protection subaspect and/or the second privacy protection subaspect. The controlling compliance of the use of the target privacy data based on the determined control rule corresponding to the target privacy data in a process of responding to the processing request includes: in the process of responding to the processing request, when it is detected, by using the first privacy protection subaspect, that the target privacy data is collected and/or consumed, controlling compliance of the use of the target privacy data based on the determined control rule corresponding to the target privacy data; and/or in the process of responding to the processing request, when it is detected, by using the second privacy protection subaspect, that the target privacy data is transferred and/or copied, controlling compliance of the use of the target privacy data based on the determined control rule corresponding to the target privacy data.

In some embodiments of this specification, the processing request includes one or more of a transfer request for the target privacy data, a copy request for the target privacy data, a collection request for the target privacy data, a destruction request for the target privacy data, and a consumption request for the target privacy data.

In some embodiments of this specification, the privacy data attribute information includes a data type and/or owner information of the target privacy data, and the data type includes a location type, an environment type, and a biological recognition type.

In some embodiments of this specification, the control rule corresponding to the target privacy data includes one or more of a lifecycle control subrule, a transfer behavior control subrule, and a permission control subrule of the target privacy data.

In some embodiments of this specification, the lifecycle control subrule is constructed by using information of one or more dimensions of valid duration, transfer times, and copy times of the target privacy data.

In some embodiments of this specification, the transfer behavior control subrule is constructed by using information of one or more dimensions of a transfer purpose, a transfer method, and a transfer direction of the target privacy data.

In some embodiments of this specification, the above-mentioned procedure further includes: obtaining information about the target privacy data, where the information about the target privacy data includes one or more of the privacy data attribute information corresponding to the target privacy data, lifecycle information of the target privacy data, transfer behavior information of the target privacy data, and permission-related information of the target privacy data; and determining a control rule corresponding to the target privacy data based on the information about the target privacy data.

According to the storage medium provided in some embodiments of this specification, a processing request for target privacy data is intercepted, and privacy data attribute information corresponding to the target privacy data is determined, where the privacy data attribute information includes information of one or more dimensions needed for controlling use of the target privacy data; then, a control rule corresponding to the target privacy data is determined based on the privacy data attribute information corresponding to the target privacy data, where the control rule corresponding to the target privacy data is constructed based on an expert knowledge base; and then, compliance of the use of the target privacy data is controlled based on the determined control rule corresponding to the target privacy data in a process of responding to the processing request. As such, the use process of the target privacy data is controlled based on the control rule corresponding to the target privacy data, and processing procedures such as production, transfer, copy, and destruction of the privacy data of the user can be further controlled, so as to protect the privacy data of the user.

Some specific embodiments of this specification are described above. Other embodiments fall within the scope of the appended claims. In some cases, actions or steps described in the claims can be performed in a sequence different from that in some embodiments and desired results can still be achieved. In addition, processes described in the accompanying drawings do not necessarily need a specific order or a sequential order shown to achieve the desired results. In some implementations, multi-tasking and parallel processing are also possible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures may be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller may be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller may be considered as a hardware component, and an apparatus included in the controller for implementing various functions may also be considered as a structure in the hardware component. Alternatively, the apparatus configured to implement various functions may even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer may be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification may use a form of hardware only embodiments, software only embodiments, or embodiments with a combination of software and hardware. In addition, one or more embodiments of this specification may use a form of a computer program product that is implemented on one or more computer-usable storage media (including but not limited to a disk memory, a CD-ROM, an optical memory, etc.) that include computer-usable program code.

Some embodiments of this specification are described with reference to flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine such that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way such that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information may be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which may be configured to store information that can be accessed by a computing device. Based on the definition in this specification, the computer-readable medium does not include transitory media such as a modulated data signal and carrier.

It should be further noted that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification may use a form of hardware only embodiments, software only embodiments, or embodiments with a combination of software and hardware. In addition, one or more embodiments of this specification may use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some system embodiments are briefly described because they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A privacy-preserving data risk prevention and control method, wherein the method comprises:
   obtaining a processing request for target privacy data;
   determining privacy data attribute information corresponding to the target privacy data, wherein the privacy data attribute information comprises information of one or more dimensions needed for controlling use of the target privacy data;
   determining a control rule corresponding to the target privacy data based on the privacy data attribute information corresponding to the target privacy data, wherein the control rule corresponding to the target privacy data is constructed based on an expert knowledge base; and
   controlling compliance of the use of the target privacy data based on the determined control rule corresponding to the target privacy data in a process of responding to the processing request, and
   the method further comprises:
   adding the target privacy data to the queue that needs to be controlled by using a predetermined privacy protection aspect, wherein the privacy protection aspect comprises a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device;
   wherein the adding the target privacy data to the queue that needs to be controlled by using a predetermined privacy protection aspect comprises:
   adding, based on the processing request for the target privacy data, the target privacy data to the queue that needs to be controlled by using the first privacy protection subaspect and/or the second privacy protection subaspect; and
   wherein the controlling compliance of the use of the target privacy data based on the determined control rule corresponding to the target privacy data in a process of responding to the processing request comprises:
   in the process of responding to the processing request, when it is detected, by using the first privacy protection subaspect, that the target privacy data is collected and/or consumed, controlling compliance of the use of the target privacy data based on the determined control rule corresponding to the target privacy data;
   and/or
   in the process of responding to the processing request, when it is detected, by using the second privacy protection subaspect, that the target privacy data is transferred and/or copied, controlling compliance of the use of the target privacy data based on the determined control rule corresponding to the target privacy data.

2. The method according to claim 1,
the obtaining the processing request for target privacy data comprises:
obtaining the processing request for the target privacy data when it is detected that a processing interface for the target privacy data receives the processing request for the target privacy data.

3. The method according to claim 1, wherein the processing request comprises one or more of a transfer request for the target privacy data, a copy request for the target privacy data, a collection request for the target privacy data, a destruction request for the target privacy data, and a consumption request for the target privacy data.

4. The method according to claim 1, wherein the privacy data attribute information comprises a data type and/or owner information of the target privacy data, and the data type comprises a location type, an environment type, and a biological recognition type.

5. The method according to claim 1, wherein the control rule corresponding to the target privacy data comprises one or more of a lifecycle control subrule, a transfer behavior control subrule, and a permission control subrule of the target privacy data.

6. The method according to claim 5, wherein the lifecycle control subrule is constructed by using information of one or more dimensions of valid duration, transfer times, and copy times of the target privacy data.

7. The method according to claim 5, wherein the transfer behavior control subrule is constructed by using information of one or more dimensions of a transfer purpose, a transfer method, and a transfer direction of the target privacy data.

8. The method according to claim 1, wherein the method further comprises:
obtaining information about the target privacy data, wherein the information about the target privacy data comprises one or more of the privacy data attribute information corresponding to the target privacy data, lifecycle information of the target privacy data, transfer behavior information of the target privacy data, and permission-related information of the target privacy data; and
determining the control rule corresponding to the target privacy data based on the information about the target privacy data.

9. A computing device comprising a memory and a processor, wherein the memory stores executable instructions that, in response to execution by the processor, cause the computing device to:
obtain a processing request for target privacy data;
determine privacy data attribute information corresponding to the target privacy data, wherein the privacy data attribute information comprises information of one or more dimensions needed for controlling use of the target privacy data;
determine a control rule corresponding to the target privacy data based on the privacy data attribute information corresponding to the target privacy data, wherein the control rule corresponding to the target privacy data is constructed based on an expert knowledge base; and
control compliance of the use of the target privacy data based on the determined control rule corresponding to the target privacy data in a process of responding to the processing request,
wherein the memory further stores executable instructions that, in response to execution by the processor, cause the computing device to
add the target privacy data to a queue that needs to be controlled by using a predetermined privacy protection aspect, wherein the privacy protection aspect comprises a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device;
wherein the adding the target privacy data to the queue that needs to be controlled by using the predetermined privacy protection aspect comprises:
adding, based on the processing request for the target privacy data, the target privacy data to the queue that needs to be controlled by using the first privacy protection subaspect and/or the second privacy protection subaspect; and
wherein the controlling compliance of the use of the target privacy data based on the determined control rule corresponding to the target privacy data in a process of responding to the processing request comprises:
in the process of responding to the processing request, when it is detected, by using the first privacy protection subaspect, that the target privacy data is collected and/or consumed, controlling compliance of the use of the target privacy data based on the determined control rule corresponding to the target privacy data;
and/or
in the process of responding to the processing request, when it is detected, by using the second privacy protection subaspect, that the target privacy data is transferred and/or copied, controlling compliance of the use of the target privacy data based on the determined control rule corresponding to the target privacy data.

10. A non-transitory computer-readable storage medium having stored therein instructions that, when executed by a processor of a computing device, cause the computing device to:
obtain a processing request for target privacy data;
determine privacy data attribute information corresponding to the target privacy data, wherein the privacy data attribute information comprises information of one or more dimensions needed for controlling use of the target privacy data;
determine a control rule corresponding to the target privacy data based on the privacy data attribute information corresponding to the target privacy data, wherein the control rule corresponding to the target privacy data is constructed based on an expert knowledge base; and
control compliance of the use of the target privacy data based on the determined control rule corresponding to the target privacy data in a process of responding to the processing request;
wherein the instructions, when executed by a processor of a computing device, further cause the computing device to
wherein the memory further stores executable instructions that, in response to execution by the processor, cause the computing device to
add the target privacy data to a queue that needs to be controlled by using a predetermined privacy protection aspect, wherein the privacy protection aspect comprises a first privacy protection subaspect and a second privacy protection subaspect, the first privacy protection subaspect is used to control processing of the target privacy data in a current terminal device, and the second privacy protection subaspect is used to control processing of outputting the target privacy data from the current terminal device;

wherein the adding the target privacy data to the queue that needs to be controlled by using the predetermined privacy protection aspect comprises:

adding, based on the processing request for the target privacy data, the target privacy data to the queue that needs to be controlled by using the first privacy protection subaspect and/or the second privacy protection subaspect; and wherein the controlling compliance of the use of the target privacy data based on the determined control rule corresponding to the target privacy data in a process of responding to the processing request comprises:

in the process of responding to the processing request, when it is detected, by using the first privacy protection subaspect, that the target privacy data is collected and/or consumed, controlling compliance of the use of the target privacy data based on the determined control rule corresponding to the target privacy data;

and/or in the process of responding to the processing request, when it is detected, by using the second privacy protection subaspect, that the target privacy data is transferred and/or copied, controlling compliance of the use of the target privacy data based on the determined control rule corresponding to the target privacy data.

11. The computing device according to claim 9, the obtaining the processing request for target privacy data comprises:

obtaining the processing request for the target privacy data when it is detected that a processing interface for the target privacy data receives the processing request for the target privacy data.

12. The computing device according to claim 9, wherein the processing request comprises one or more of a transfer request for the target privacy data, a copy request for the target privacy data, a collection request for the target privacy data, a destruction request for the target privacy data, and a consumption request for the target privacy data.

13. The computing device according to claim 9, wherein the privacy data attribute information comprises a data type and/or owner information of the target privacy data, and the data type comprises a location type, an environment type, and a biological recognition type.

14. The computing device according to claim 9, wherein the control rule corresponding to the target privacy data comprises one or more of a lifecycle control subrule, a transfer behavior control subrule, and a permission control subrule of the target privacy data.

15. The computing device according to claim 14, wherein the lifecycle control subrule is constructed by using information of one or more dimensions of valid duration, transfer times, and copy times of the target privacy data.

16. The computing device according to claim 14, wherein the transfer behavior control subrule is constructed by using information of one or more dimensions of a transfer purpose, a transfer method, and a transfer direction of the target privacy data.

* * * * *